P. A. PETERSON.
COMBINATION IMPLEMENT.
APPLICATION FILED AUG. 26, 1919.
1,341,759.
Patented June 1, 1920.
2 SHEETS—SHEET 2.
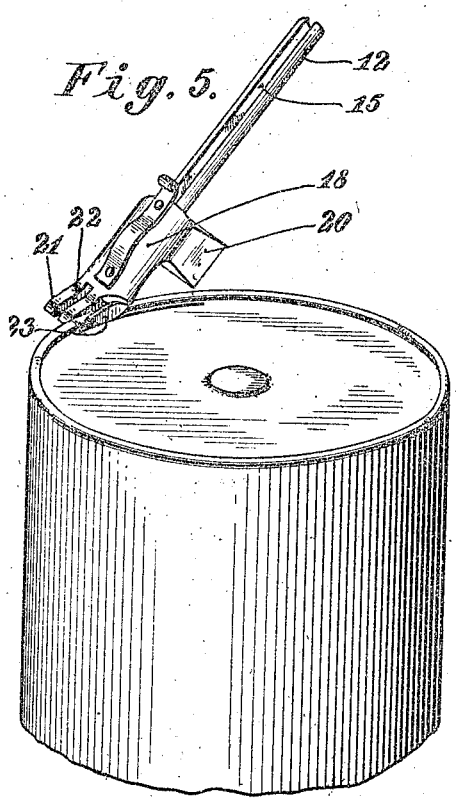
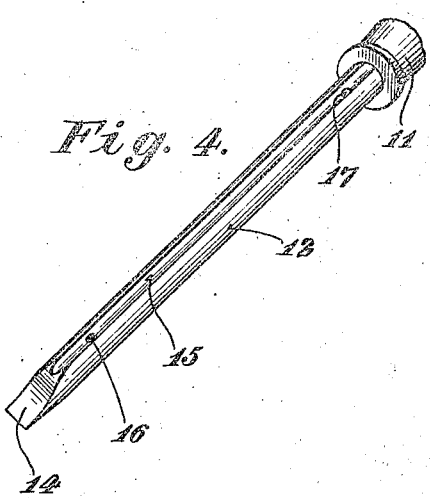
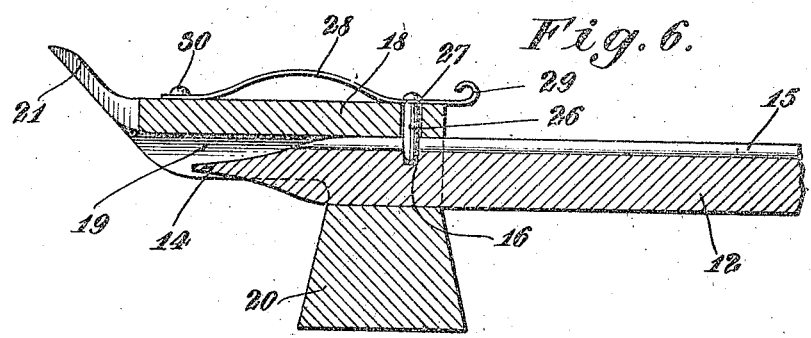
Inventor
Per A. Peterson
By his Attorney
Frederick Myers

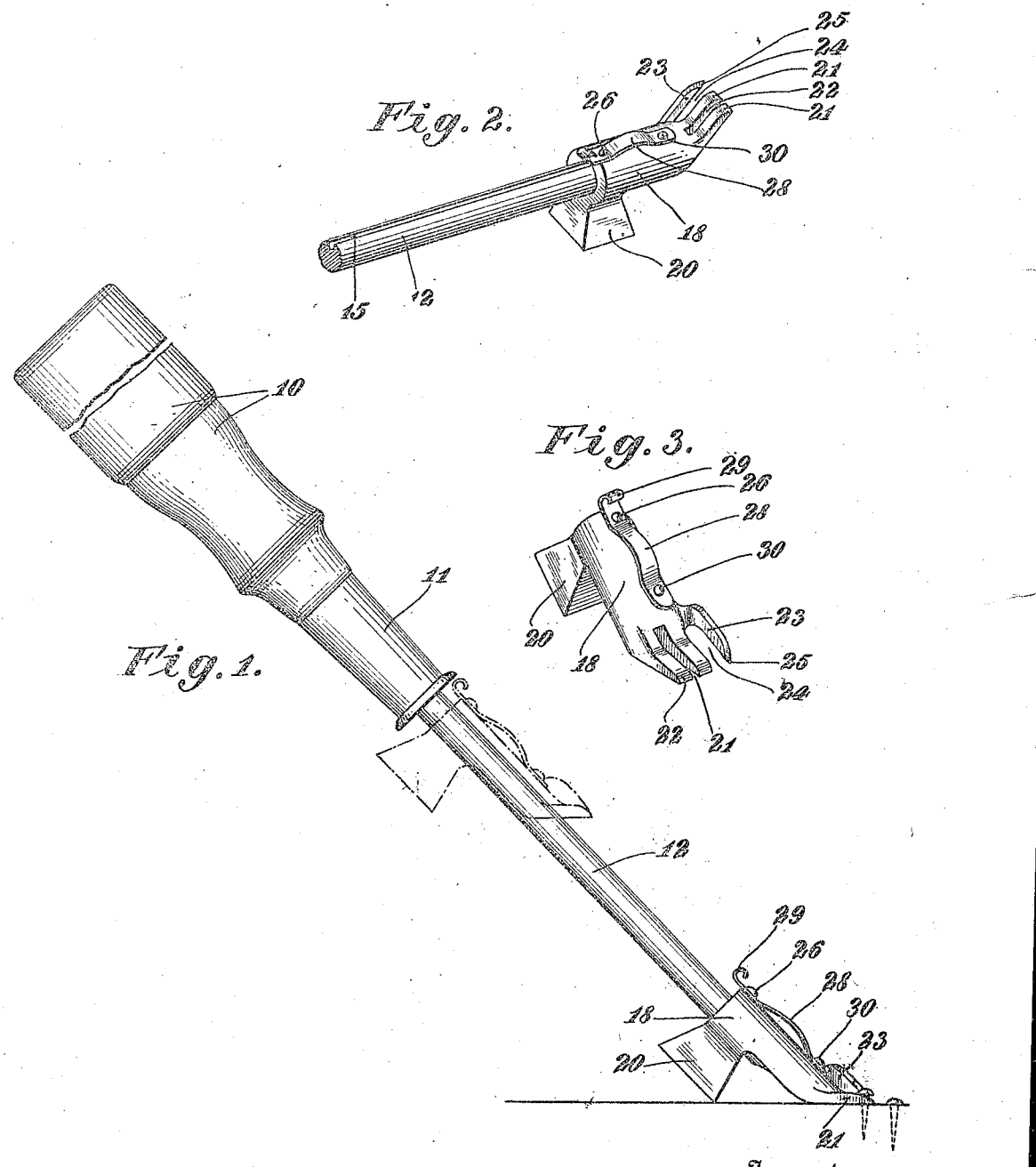

UNITED STATES PATENT OFFICE.

PER A. PETERSON, OF NEW YORK, N. Y.

COMBINATION IMPLEMENT.

1,341,759.  Specification of Letters Patent.  Patented June 1, 1920.

Application filed August 26, 1919. Serial No. 320,025.

*To all whom it may concern:*

Be it known that I, PER A. PETERSON, a citizen of the United States, and resident of the city, county, and State of New York, have invented certain new and useful Improvements in Combination Implements, of which the following is a specification.

This invention has as its object, to provide a convenient implement for household uses, the same comprising a conventional type of screw-driver, its shank being suited to receive an attachment combining in its structure a pair of claws adapted for pulling tacks, a hammer, and an efficient can opener.

This object is attained by the novel construction, combination and arrangement of parts hereinafter described and shown in the accompanying drawings, forming a material part of this disclosure, and in which:—

Figure 1 is a side elevational view of an implement made in accordance with the invention and indicating its application as a tack puller;

Fig. 2 is a fragmentary perspective view of the same;

Fig. 3 is a perspective view showing the attachment in detail;

Fig. 4 is a perspective view showing the shank portion of a screw-driver adapted to receive the attachment;

Fig. 5 is a perspective view illustrating the use of the implement as a can-opener; and Fig. 6 is an enlarged longitudinal, fragmentary sectional view taken through the center of the implement.

Referring to the drawings in detail, the numeral 10 designates the handle of a conventional type of screw-driver, the same having a rigid metallic ferrule 11 through which passes the shank 12 of the screw-driver blade 14, the shank here being shown as comprised of a round steel rod firmly secured in its handle.

Formed longitudinally in the shank 12 is a shallow groove or slot 15 relatively narrow and rounded at the bottom. Extending below the bottom of the slot are two recesses 16 and 17, positioned respectively near the blade 14 and ferrule 11, the purpose of which will be further on described.

A head, generally designated by the numeral 18, contains a longitudinal passage 19 adapted to receive the shank 12, and formed integral with it, on its lower side at the rear, is a solid block 20 preferably of square cross-section, this block being adapted for use as a hammer.

Extending at an upward angle at the front are a pair of prongs 21 having a space 22 therebetween, these prongs having sharp angular advance edges adapted to be pressed below the head of a tack, small nail or the like, as best shown in Fig. 1, whereby the same may be raised by properly manipulating the screw-driver, the block 20 acting as fulcrum for the lever thus provided.

A blade 23 is also integrally formed with the head 18, the same being laterally separated from the prongs by a space 24 and raised slightly above them. This blade has a convex sharply-formed upper edge and an acute point 25 adapted to be forced into the cover of a can, as best shown in Fig. 5, while the adjacent prong acts as a guide enabling an operator to easily shear the top near its marginal edge, the rim of the can entering into the space 24, thus affording means for separating the covers of cans of any form in an efficient manner.

The head 18 is maintained in engagement with the shank under normal conditions by a detent pin 26, the same passing freely through an opening 27 in its upper portion, opposite the hammer 20, the pin being riveted to a bent flat spring 28, near its outer free end 29 which is upturned so as to be easily raised by an operator, the other end of the spring being secured to the head 18 by a rivet 30.

In operation, the head 18 is passed over the screw-driver blade, the detent engaging in the slot 15 so as to guide the head and prevent it from turning; and when the device is used only for its function in driving screws, the head is moved upward on the shank until the detent pin 26 engages in the recess 17, which maintains the slidable elements closely adjacent the handle, as indicated by the broken lines in Fig. 1.

When the device is to be used as a hammer, tack puller or can opener, the head is moved down on the shank until the detent engages in the recess 16, holding the head at the end of the shank, which, together with the handle, constitutes a lever whereby the element 20 may be used in delivering blows, or as a fulcrum when using the prongs, the bottoms of the prongs acting as a fulcrum when shearing a can top by the cutter 23.

From the foregoing it will be seen that a convenient and practical implement has been disclosed capable of performing several of the constantly occurring requirements of domestic nature in an efficient and satisfactory manner.

This disclosure is to be regarded as mainly descriptive and not restrictive or limitative of the invention, of which obviously other embodiments may be constructed, including many minor modifications, without departing from the general scope herein indicated and here claimed.

What I claim is:—

1. In a device of the class described, the combination with a handle having a straight cylindrical shank of uniform thickness, of a head slidable on said shank, means for maintaining said head in either of two definite positions on said shank, a cutter carried by said head, and means for guiding said cutter laterally.

2. In a device of the class described, the combination with a handled cylindrical lever containing a longitudinal slot in one side and indentations formed in the bottom of the slot approximately at its ends, of a head slidable on said lever, a spring-actuated detent carried by said head engageable in either of the mentioned indentations, and a fulcrum for said lever formed with said head.

3. In a device of the class described, the combination with a handle and an elongated shank secured therein, of a head slidable on said shank, a spring-actuated detent carried by said head engageable in recesses formed in said shank and head, means preventing relative rotation of said head and shank, and trifurcated extensions at the extremity of said head, two of said extensions acting as prongs and one as a cutter.

4. In a device of the class described, the combination with a lever having a straight shank containing a longitudinal slot and a pair of recesses extending downward therefrom, of a head slidable on said shank, means carried by said head engageable in the mentioned slot and recesses, a block formed at the rear of said head opposite said engaging means, said block acting as a fulcrum for said lever, a pair of spaced prongs extending angularly outward from said head at the front thereof, and a cutting element formed with said head spaced laterally from said prongs and raised thereabove.

In testimony whereof I have signed my name to this specification.

PER A. PETERSON.